Patented Mar. 15, 1927.

1,621,468

UNITED STATES PATENT OFFICE.

WILLIAM BEACH PRATT, OF WELLESLEY, MASSACHUSETTS, ASSIGNOR TO RESEARCH, INCORPORATED, OF BOSTON, MASSACHUSETTS, A CORPORATION OF MASSACHUSETTS.

AQUEOUS RUBBER DISPERSION AND PROCESS OF PRODUCING THE SAME.

No Drawing. Application filed July 2, 1923. Serial No. 649,158.

This invention has relation to aqueous diffusions, dispersions or emulsions of crude or previously coagulated rubber, or synthetic rubber, or unvulcanized rubber compounds, such as generally referred to in my application Serial No. 604,616, filed December 2, 1922, and also in my application Serial No. 631,451, filed April 11, 1923.

I have made the discovery that it is possible to diffuse, disperse or emulsify crude or previously coagulated rubber, and kindred substances, in water without the employment of soap produced by the reaction of an alkali or alkaline material, such as a caustic alkali or ammonia with a saponifiable agent. That is to say, I have discovered that it is possible to effect a dispersion of the rubber or rubber compound in water by the use of a saponin, or what may be called a natural vegetable soapy substance. Instead of using saponin in a substantially pure form, I have found that I may, with even greater advantage, employ as the emulsifying agent an aqueous extract or infusion of soap bark. This I regard as highly advantageous not only for the purposes of economy, as it enables me to dispense with the employment of relatively expensive saponifiable agents, such as fatty acids, or the glycerides of fatty acids, but also because it avoids the presence of any alkali or alkaline matter in the aqueous rubber dispersion; and, consequently, the aqueous rubber dispersion or emulsion may be concentrated to the desired extent without coagulation of the rubber globules and without deleterious effect on the subsequent vulcanization.

In carrying out this process, crude rubber or the crude rubber compound may be primarily converted into a colloidal solution, so far as the rubber is concerned, by the use of a solvent of the aromatic or carbo-cyclic series, such as benzene ($C_6H_6$), that commercial mixture known as benzol, toluol or their equivalent. After the dispersion is effected, the solvent is removed and preferably recovered for reuse.

As illustrating an example of the procedure which may be followed in the practice of my invention, 35 pounds of crude rubber, e. g. that obtained from *Hevea Braziliensis*, is dissolved in 65 pounds of commercial benzol to produce a 35% colloidal solution. This is effected by a churn or mechanical mixer, and the product is substantially a physically homogeneous paste. I now dissolve about 1.75 pounds of saponin in about 10 pounds of water, and this solution is stirred into and thoroughly mixed with the rubber-benzol solution at ordinary room temperature. 90 pounds of water are now preferably thoroughly stirred into and mixed with the product previously obtained. As the stirring proceeds, the water, which first forms the disperse phase, with the continued stirring soon forms the continuous phase of the dispersion or emulsion. Instead of mixing the water into and with the rubber-benzol solution, the latter may be stirred into and mixed with the water. The benzol remaining in the product is removed by distillation or evaporation, preferably under a vacuum, so as to avoid the use of excessive heat such as would tend to cause the recoagulation of the rubber. In the resulting product, the rubber apparently has been entirely decoagulated and dispersed and the dispersed rubber globules are apparently of the same size and form as in the latex from which the crude rubber was coagulated.

Instead of dispersing crude rubber alone in water, the rubber may be previously compounded with sulphur, zinc oxide, commercial mineral rubber, commercial accelerator, and other compounding materials, as may be desired, so that in the subsequent vulcanizing process the vulcanized rubber of any particular character may be secured. Thus any of the commercial rubber compounds may be first produced by milling and then dispersed in water by the process hereinbefore outlined. Those materials which are not dissolved or emulsified are distributed through the final aqueous rubber dispersion.

The dispersed mass produced in either case after the removal of the benzol may now be concentrated by the removal of more or less of the vegetable soap-like substance and the water, and to that end the mass may be placed in a centrifuge and subjected to centrifugation. A centrifugal machine of the character of a cream separator may be employed for this purpose. After the separation of the water and the soap-like substance, which may be effected several times or in several steps by diluting with water the resulting diffusion, a thick pasty mass may be produced having the general character of a thick smooth mud formed of smooth clay and water, and in this paste the rubber particles or globules are not coagulated but are dispersed in the aqueous medium. The pasty mass produced as a result of the centrifugation is homogeneous, non-tacky, spreads evenly and does not coagulate on standing, nor do the solids separate from the water in commercial application.

Instead of using substantially pure saponin, I find that I may use a much less expensive vegetable soapy substance, namely, the extract of soap bark, and that a smaller quantity of the extract, say 1%, may be employed than when saponin is used in a substantially pure form. Any suitable procedure for extracting the soap bark in water may be followed; for example, equal quantities by weight of soap bark and water may be heated to a temperature less than the boiling point of water, for a short time, say twenty minutes, after which the water containing the extract is decanted. The soap bark may be again extracted with an equal amount of water. The extract in each case contains the active principles of the soap bark.

The saponin and the soap bark extract apparently have the best effect in reducing the interfacial tension of the benzol, the benzol-saturated rubber globules and the water, and make it possible to secure a dispersion of the rubber globules with great ease when the water and rubber-benzol solution are mixed in the presence thereof.

The soap bark extract, if desired, may be dried to powder form and the powder dissolved in water for making the aqueous rubber dispersion.

So far as I am aware, I am the first to have discovered that the product of extraction from such vegetable compounds may be employed, with water as an emulsifying agent, in dispensing crude or coagulated rubber or kindred products in water; and in the claims, in referring to "soapy vegetable extracts", I mean to include saponins, as well as extracts from "soap bark" so-called.

I have formed the opinion that, when previously coagulated rubber or crude rubber is treated with a solvent, benzol for example, to form a colloidal solution,—coincidently with the swelling of the rubber globules, due to their absorption of the benzol, the globules tend to and actually do separate from each other as their interfacial tension is reduced. Hence, in order to maintain the separation of the globules when water is added and/or the benzol is removed, some substance must be employed which will also reduce or keep negligible the interfacial tension of the globules. I have found that the best results are secured when that substance is employed which has the greatest effect in reducing the interfacial tension of benzol and water, and this leads me to the conclusion that the function of such substance is to permit the separation of the benzol from the aqueous dispersion as well as to prevent the rubber globules from cohering or coagulating as they shrink in size due to the removal of benzol previously absorbed thereby.

In the initial colloidal benzol-rubber solution, the swollen rubber globules are sticky, and any finely divided substances which were in admixture with the rubber (such for example as sulphur, zinc oxide, whiting and the like) attach themselves in the form of fine particles to the rubber globules. Subsequently, when the aqueous dispersion is effected and the benzol is removed, there appears to be an adhesion of the fine particles to the rubber globules which ensures the distribution of such particles throughout the mass. Prior to the concentration of the dispersion, if there be no addition of relatively heavy compounding materials, the rubber globules tend to float at the top, in time, like cream on milk; but, if the compounding materials have a high specific gravity, such as litharge for example, the rubber tends to settle, in time, at the bottom of the aqueous dispersion. In either case, the separation of the rubber globules and the compounding agents from the water is easily effected by well known processes.

What I claim is:—

1. A process of dispersing rubber in water, which comprises dissolving rubber in a solvent, then mixing such solution with water in the presence of a soapy vegetable extract whereby the rubber globules are dispersed in the aqueous medium, without breaking down the physical structure of the globules, and finally removing the solvent without recoagulating the dispersed rubber globules.

2. A process of dispersing rubber in water, which comprises dissolving rubber in a solvent, mixing the solution with water containing a soapy vegetable extract, then mixing the resulting mass and water so that the water forms the continuous phase of the dispersion or emulsion, and the decoagulated rubber globules are dispersed therein, without affecting the physical structure of the globules, and finally removing the solvent without recoagulating the dispersed rubber globules.

3. A process of dispersing in water an unvulcanized rubber compound, including rubber and sulphur, which comprises first compounding said materials, mixing the compound with a rubber solvent, dispersing the product in water in the presence of a soapy vegetable extract, wherein the rubber globules approximate the size and shape of the rubber globules in latex, and finally removing the solvent without recoagulating the dispersed rubber globules.

4. A process of dispersing rubber in water, which comprises dissolving rubber in a solvent, then mixing such solution with water in the presence of a soapy vegetable extract whereby the rubber globules are dispersed in the aqueous medium, and removing said solvent without coagulating the rubber globules, thereby leaving the rubber globules dispersed in the aqueous vehicle.

5. A process of dispersing rubber in water, which comprises dissolving rubber in a solvent, mixing the solution with water containing a soapy vegetable extract, then mixing the resulting mass and water until the water forms the continuous phase of the dispersion or emulsion, and the decoagulated rubber globules are dispersed therein, and removing said solvent without coagulating the rubber globules, thereby leaving the rubber globules dispersed in the aqueous vehicle.

6. A process of dispersing rubber in water, which comprises dissolving rubber in a solvent, then mixing such solution with water in the presence of a soapy vegetable extract whereby the rubber globules are dispersed in the aqueous medium, removing the solvent, and concentrating the product by removal of water until a smooth paste results.

7. A process of dispersing rubber in water, which comprises dissolving rubber in a solvent, mixing the solution with water containing a soapy vegetable extract, then mixing the resulting mass and water so that the water forms the continuous phase of the dispersion or emulsion, and the decoagulated rubber globules are dispersed therein, removing said solvent, and concentrating the resultant product by removal of water until a smooth paste results, all without recoagulation of the rubber globules.

8. A process of dispersing in water an unvulcanized rubber compound, including rubber and sulphur, which comprises first compounding said materials, mixing the compound with a rubber solvent, dispersing the product in water in the presence of a soapy vegetable extract, and removing the rubber solvent, thereby leaving the rubber globules dispersed in the aqueous vehicle.

9. A process of dispersing in water an unvulcanized rubber compound, including rubber and sulphur, which comprises first compounding said materials, mixing the compound with a rubber solvent, dispersing the product in water in the presence of a soapy vegetable extract, removing the rubber solvent, and finally removing sufficient water to leave a smooth paste without recoagulating the rubber globules, which approximate in size and shape the rubber of latex.

10. A process of dispersing unvulcanized rubber in water, which comprises dissolving such rubber in a rubber solvent, and mixing the solution with water, in the presence of an extract of soap bark, until the rubber is dispersed in the water in separated globules.

11. A process of dispersing unvulcanized rubber in water, which comprises dissolving such rubber in a rubber solvent, mixing the solution with water, in the presence of an extract of soap bark, until the rubber is dispersed in the water, and removing the solvent.

12. A process of dispersing unvulcanized rubber in water, which comprises dissolving such rubber in a rubber solvent, mixing the solution with water, in the presence of an extract of soap bark, removing the solvent, and then concentrating the product to the form of a smooth paste without recoagulating the rubber globules, which approximate in size and shape those in rubber latex.

In testimony whereof I have affixed my signature.

WILLIAM BEACH PRATT.